United States Patent
Gill et al.

(10) Patent No.: US 12,418,183 B1
(45) Date of Patent: Sep. 16, 2025

(54) POWER BALANCING FOR A POWER SUPPLY SYSTEM

(71) Applicant: Juniper Networks, Inc., Sunnyvale, CA (US)

(72) Inventors: Jaspal S. Gill, Tracy, CA (US); Katsuhiro Okamura, Watsonville, CA (US); Varaha Venkata Satya Narayana Jagarapu, Sunnyvale, CA (US); David K. Owen, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 91 days.

(21) Appl. No.: 18/472,546

(22) Filed: Sep. 22, 2023

(51) Int. Cl.
*H02J 3/46* (2006.01)

(52) U.S. Cl.
CPC ..................................... *H02J 3/46* (2013.01)

(58) Field of Classification Search
CPC ..................................... H02J 3/46; H02J 3/38
USPC .......................................................... 307/52
See application file for complete search history.

(56) References Cited

U.S. PATENT DOCUMENTS

| | | | |
|---|---|---|---|
| 2009/0289502 A1* | 11/2009 | Batarseh | H02J 1/102 307/43 |
| 2012/0313528 A1* | 12/2012 | Chen | H05B 47/23 315/121 |

* cited by examiner

*Primary Examiner* — Hal Kaplan
(74) *Attorney, Agent, or Firm* — Harrity & Harrity, LLP

(57) ABSTRACT

In some implementations, a power balancing device may monitor a power supply module (PSM) that includes multiple power supply channels. The PSM may be part of a power supply system for a network component that includes multiple PSMs, with each of the multiple PSMs being associated with a maximum output power. The power balancing device may determine that at least one power supply channel, of the multiple power supply channels, is inoperable. The power balancing device may determine, based on determining that the at least one power supply channel is inoperable, a revised maximum output power for the PSM based on a maximum allowable input current to each power supply channel, of the multiple power supply channels. The power balancing device may cause the PSM to output a power that is less than or equal to the revised maximum output power.

20 Claims, 10 Drawing Sheets

2-Channel 3 kW PSM

130 ~

| Input Mode | Load (W) | Vis (V) |
|---|---|---|
| Single Feed ($K = 1.6$) | 0 | 0 |
| | 1500 | 4 |
| | 3000 | 8 |

128 ~

| Input Mode | Load (W) | Vis (V) |
|---|---|---|
| Dual Feed (no power adjust.) | 0 | 0 |
| | 1875 | 4 |
| | 3750 | 8 |

4-Channel 8 kW PSM

138 ~

| Input Mode | Load (W) | Vis (V) |
|---|---|---|
| Single Feed ($K = 1.5$) | 0 | 0 |
| | 1500 | 4 |
| | 3000 | 8 |

134 ~

| Input Mode | Load (W) | Vis (V) |
|---|---|---|
| Three Feed ($K = 1.33$) | 0 | 0 |
| | 4000 | 4 |
| | 8000 | 8 |

136 ~

| Input Mode | Load (W) | Vis (V) |
|---|---|---|
| Dual Feed ($K = 1.5$) | 0 | 0 |
| | 3000 | 4 |
| | 6000 | 8 |

132 ~

| Input Mode | Load (W) | Vis (V) |
|---|---|---|
| Four Feed (no power adjust.) | 0 | 0 |
| | 4000 | 4 |
| | 8000 | 8 |

FIG. 1E

POWER BALANCING FOR A POWER SUPPLY SYSTEM

BACKGROUND

A power supply module (PSM) is an electronic device that supplies electrical energy to an electrical load. The PSM may be a discrete device or may be built into another device (e.g., a power supply system), such as a PSM included in a desktop computer, a consumer electronics device, a network device, or the like. The power supply system may have multiple PSMs to supply power to one or more electrical loads associated with the power system.

SUMMARY

Some implementations described herein relate to a method. The method may include monitoring, by a power balancing device, a power supply module (PSM) that includes multiple power supply channels, wherein the PSM is part of a power supply system for a network component, wherein the power supply system includes multiple PSMs, and wherein each of the multiple PSMs is associated with a maximum output power. The method may include determining, by the power balancing device, that at least one power supply channel, of the multiple power supply channels, is inoperable. The method may include determining, by the power balancing device and based on determining that the at least one power supply channel is inoperable, a revised maximum output power for the PSM based on a maximum allowable input current to each power supply channel, of the multiple power supply channels. The method may include causing, by the power balancing device, the PSM to output a power that is less than or equal to the revised maximum output power.

Some implementations described herein relate to a power balancing device. The power balancing device may include one or more memories and one or more processors. The one or more processors may be configured to monitor a PSM that includes multiple power supply channels, wherein the PSM is part of a power supply system for a network component, wherein the power supply system includes multiple PSMs, and wherein each of the multiple PSMs is associated with a maximum output power. The one or more processors may be configured to determine that at least one power supply channel, of the multiple power supply channels, is inoperable. The one or more processors may be configured to determine, based on determining that the at least one power supply channel is inoperable, a revised maximum output power for the PSM based on a maximum allowable input current to each power supply channel, of the multiple power supply channels. The one or more processors may be configured to cause the PSM to output a power that is less than or equal to the revised maximum output power.

Some implementations described herein relate to a non-transitory computer-readable medium that stores a set of instructions. The set of instructions, when executed by one or more processors of a power balancing device, may cause the power balancing device to monitor a power supply system for a network component, wherein the power supply system includes multiple PSMs that each include multiple power supply channels, and wherein each of the multiple PSMs is associated with a default maximum output power. The set of instructions, when executed by one or more processors of the power balancing device, may cause the power balancing device to determine that at least one power supply channel, of the multiple power supply channels of a PSM, of the multiple PSMs, is inoperable. The set of instructions, when executed by one or more processors of the power balancing device, may cause the power balancing device to determine, based on determining that the at least one power supply channel is inoperable, a revised maximum output power for the PSM based on a maximum allowable input current to each power supply channel, of the multiple power supply channels. The set of instructions, when executed by one or more processors of the power balancing device, may cause the power balancing device to cause the PSM to output a power that is less than or equal to the revised maximum output power.

BRIEF DESCRIPTION OF THE DRAWINGS

FIGS. 1A-1F are diagrams of an example implementation associated with power balancing for a power supply system.

DETAILED DESCRIPTION

Figure 1A:
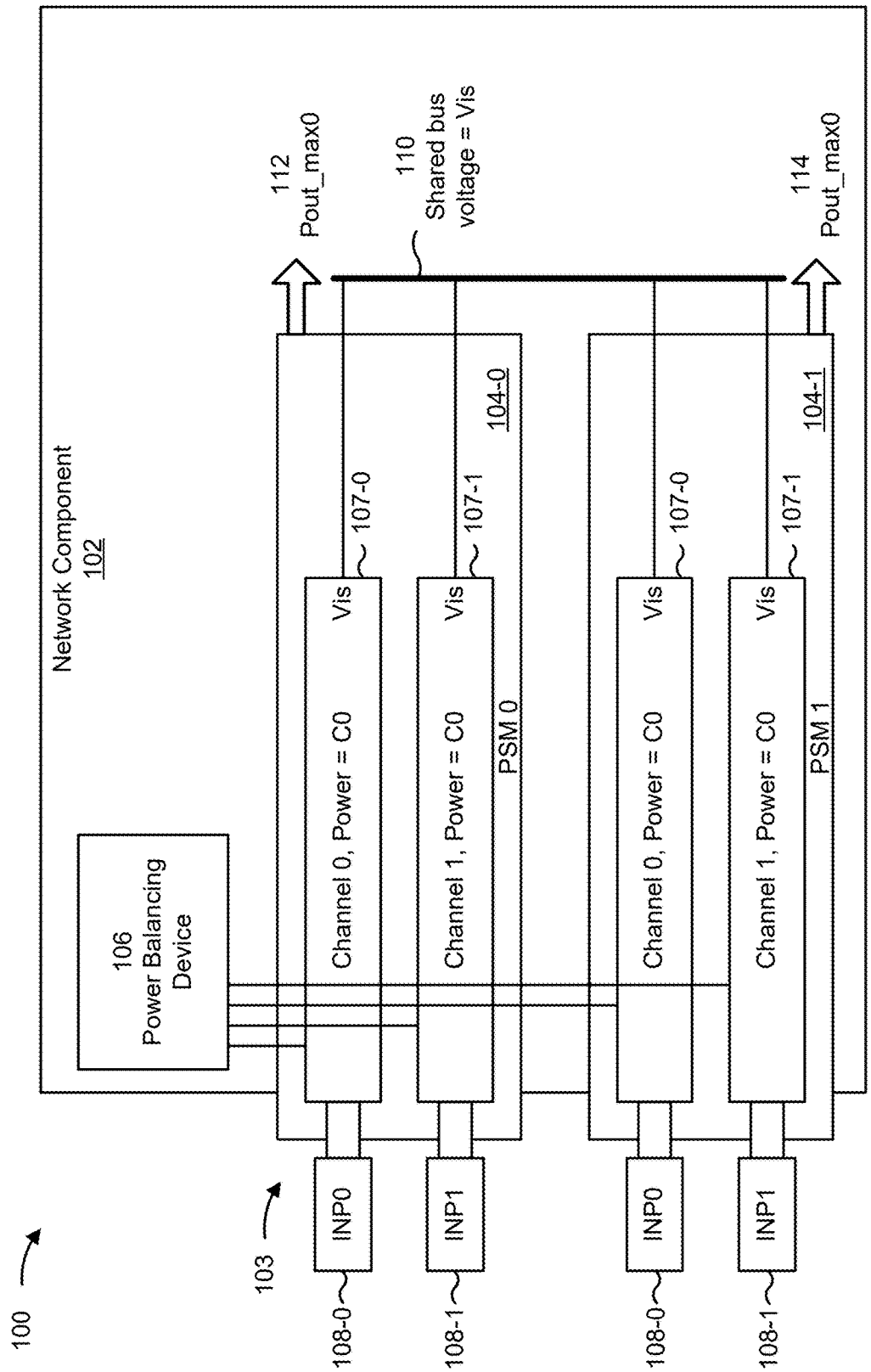

The following detailed description of example implementations refers to the accompanying drawings. The same reference numbers in different drawings may identify the same or similar elements.

A network device, such as a router, a label switching router (LSR), a label edge router (LER), an ingress router, an egress router, a provider router (e.g., a provider edge router or a provider core router), a virtual router, a gateway, a switch, a firewall, a hub, a bridge, a reverse proxy, a server (e.g., a proxy server, a cloud server, or a data center server), a load balancer, and/or a similar network device, may be implemented within a housing, such as a chassis. The chassis may include a power supply system for supplying power to one or more components associated with the network device. The power supply system may include multiple PSMs (e.g., multiple alternating current (AC)/direct current (DC) PSMs), each including multiple power inputs and/or power supply channels, such as for a purpose of providing an electrical power to the one or more components.

For example, an eight-slot chassis may be associated with a power supply system that includes twenty AC/DC PSMs, six AC/DC PSMs, or a different quantity of AC/DC PSMs. Moreover, a sixteen-slot chassis may be associated with a power supply system that includes thirty AC/DC PSMs, ten AC/DC PSMs, or a different quantity of AC/DC PSMs. Each PSM may be a dual-feed PSM (e.g., a PSM associated with two power inputs and/or two power supply channels), a four-feed PSM (e.g., a PSM associated with four power inputs and/or four power supply channels), or another multi-feed PSM. The multiple PSMs may be connected in parallel in the chassis, such as via a power shelf, a midplane, or a similar structure. In this regard, managing power and current share among the PSMs may be challenging given the quantity of PSMs in the power supply system per chassis and/or the total number of feeds associated with each of the PSMs.

For example, if one or more power inputs and/or power supply channels of a given PSM becomes inoperable, a load placed on the remaining inputs and/or power supply channels may increase and thus a current at the remaining inputs and/or power supply channels may exceed an overcurrent protection (OCP) amperage associated with the PSM (e.g., 16 amps (A)). This may result in a circuit breaker associated with the PSM (e.g., a feeder breaker) tripping and/or may cause the PSM to shut down completely. As one or more PSMs shutdown in this manner, a load may be increased on other PSMs in the power supply system, which may result in cascading shutdowns of the PSMs as each hits an OCP amperage, until the entire power system is shut down. This type of power supply failure may result in inoperable network components and thus decreased network capacity, increased network latency, and overall inefficient usage of network resources. In some cases, the power supply system may remain inoperable until a faulty input and/or power supply channel is identified and repaired and/or until the circuit breakers associated with each PSM are manually restored.

Some implementations described herein enable dynamic feed current sharing in order to balance a current among various feeds in a power supply system, such as when multiple PSMs are connected in parallel in a power supply system and at least one PSM, of the multiple PSMs, including a different quantity of active feeds than other PSMs due to failure of one or more inputs and/or power supply channels. In some implementations, a power balancing device may monitor power supply channels of one or more PSMs included in a power supply system of a network component (e.g., an eight-slot or sixteen-slot chassis, or the like). Upon determining that at least one power supply channel is inoperable, the power balancing device may compute or otherwise determine a revised maximum output power for the PSM, which may be a maximum power that the PSM may output without exceeding a certain amperage (e.g., 16 A) on the remaining operable power supply channels at the PSM. Accordingly, the power balancing device may cause the PSM to output a power that is no more than the revised maximum output power, thereby reducing a chance that the PSM will shut down due to an OCP system or the like, and thus reducing a chance of a cascading shutdown of the PSMs and ultimately a shutdown of the power supply system as a whole. Reducing shutdowns of the PSMs and/or the power supply system in this way may result in increased network capacity, decreased network latency, and overall more efficient usage of network resources because network components may remain online even if one or more power inputs and/or power supply channels become inoperable.

FIGS. 1A-1F are diagrams of an example implementation 100 associated with power balancing for a power supply system. As shown in FIGS. 1A-1F, example implementation 100 includes a network component 102 (e.g., a chassis, such as an eight-slot or sixteen-slot chassis), a power supply system 103 including multiple PSMs 104 (shown in FIGS. 1A-1F as a first PSM 104-0 through a second PSM 104-1, but which may include a different quantity of PSMs 104 in other implementations, such as six or twenty PSMs 104 for an eight-slot chassis, ten or thirty PSMs for a sixteen-slot chassis, or the like) that may be configured to supply power to the network component 102, and a power balancing device 106 that may be configured to balance a load across multiple feeds (e.g., power supply channels) of the power supply system 103. These devices are described in more detail below in connection with FIGS. 2-4.

In some implementations, the PSMs 104 may be associated with multiple feeds (e.g., multiple power supply channels 107, shown in FIG. 1A as a first power supply channel 107-0 through a second power supply channel 107-1, and/or multiple power inputs 108, shown in FIG. 1 as a first power input 108-0 through a second power input 108-1). More particularly, in the implementation shown in FIG. 1A, each PSM 104 is a dual-feed PSM, and thus each PSM 104 includes two power supply channels 107 (e.g., channel 0 and channel 1) and two corresponding power inputs 108 (e.g., INP0 and INP1). However, in some other implementations, each PSM 104 may include a different quantity of feeds, power supply channels 107, and/or power inputs 108. For example, in some implementations, a PSM 104 may be a four-feed PSM, and thus the PSM 104 may be associated with four feeds (e.g., four power supply channels 107 and/or four power inputs 108).

In some implementations, each power supply channel 107 may be associated with a common voltage pin and/or connector, such as a pin and/or connector connecting the respective power supply channel 107 to a shared bus 110 and/or a shared bus voltage (sometimes referred to as an "Ishare voltage" and/or "Vis"). In some implementations, the shared bus voltage (e.g., Vis) may be a voltage used to indicate to each power supply channel 107 a corresponding voltage to be supplied by the power supply channel 107 and/or a corresponding load to be handled by the power supply channel 107. More particularly, under normal operating conditions (e.g., conditions in which each power supply channel 107 of each PSM 104 of the power supply system 103 is operable), each power supply channel 107 may be configured to equally share an electrical load on the power supply system 103 and/or output a certain power (shown in FIG. 1A as "C0") in order to support the electrical load. Thus, for the implementation shown in FIG. 1A, each power supply channel 107 may be configured to output a power of C0, which may be equal to 1/N-th of the total electrical load on the power supply system 103, where N is equal to the total quantity of feeds, power supply channels 107, and/or power inputs 108 associated with the power supply system 103. In that regard, for the implementation shown in FIG. 1A, a total power output by the power supply system 103 at any given time may be equal to 4×C0.

In such implementations, each power supply channel 107 may be configured to output a power between 0 watts (W) and $C0_{max}$ W, based on the shared bus voltage (e.g., Vis) present at a respective common voltage pin and/or connector of the power supply channel 107. Thus, when Vis=0 Volts (V) (e.g., corresponding to no electrical load at the power supply system 103), each power supply channel 107 may output 0 W. When Vis=$Vis_{max}$ (e.g., corresponding to a maximum electrical load at the power supply system 103), each power supply channel 107 may output $C0_{max}$ W. And when 0<Vis<$Vis_{max}$, each power supply channel 107 may output an amount of power that is less than a maximum power output of the power supply channel 107 and/or that is proportional to Vis/$Vis_{max}$. More generally, an amount of power output at each power supply channel 107 (e.g., C0) may be associated with the expression C0=(Vis/$Vis_{max}$)× $C0_{max}$.

Accordingly, under normal operating conditions, each PSM 104 may be associated with a maximum output power (sometimes referred to as Pout_max0), which may be equal to a number of power supply channels 107 associated with the PSM 104 (sometimes referred to as M, with M=2 for a dual-feed PSM, M=4 for a four-feed PSM, and so forth) multiplied by a maximum output power of each power supply channel, $C0_{max}$ (e.g., Pout_max0=$C0_{max}$×M). In that regard, under normal operating conditions, the first PSM 104-0 may be associated with a maximum output power of Pout_max0, as indicated by reference number 112, and similarly the second PSM 104-0 may be associated with the maximum output power of Pout_max0, as indicated by reference number 114.

In some implementations, the power balancing device 106 may be configured to monitor power supply channels 107 associated with one or more PSMs 104 and/or may be configured to balance a load among operable power supply channels 107, such as in response to the power balancing device 106 detecting that one or more power supply channels 107 of one or more PSMs 104 are inoperable. As shown in FIG. 1A, in some implementations a single power balancing device 106 may be configured to monitor power supply channels 107 of multiple PSMs 104, such as the power supply channels 107 of the first PSM 104-0 and the second PSM 104-1 in FIG. 1A. However, in some other implementations, the power balancing device 106 may be configured to monitor a single PSM 104 and/or power supply channels 107 associated with a single PSM 104. Put another way, in some implementations, each PSM 104 may be associated with a respective power balancing device 106.

Additionally, or alternatively, as shown in FIG. 1A, the power balancing device 106 may be external to the PSMs 104, such within a power shelf of the network component 102, among other examples. However, in some other implementations, the power balancing device 106 may be internal to a PSM 104. Put another way, in some implementations, each PSM 104 may internally include a respective power balancing device 106. Accordingly, although the following operations are described in connection with a single power balancing device 106 for ease of discussion, in some other implementations one or more of the below-described operations may be performed by multiple power balancing devices 106.

In FIG. 1A, each power supply channel 107 is in an operable state, and thus the power balancing device 106 may be configured to allocate an electrical load equally among the PSMs 104 and/or the power supply channels 107. More particularly, the power balancing device 106 may be configured to allocate 1/N-th of the load (e.g., ¼th of the load in the implementation shown in FIG. 1A) to each of the power supply channels 107, such that each power supply channel 107 is allocated an equal share of the total electrical load on the power supply system 103 and/or such that each power supply channel 107 outputs an equal output power (e.g., C0).

Figure 1B:
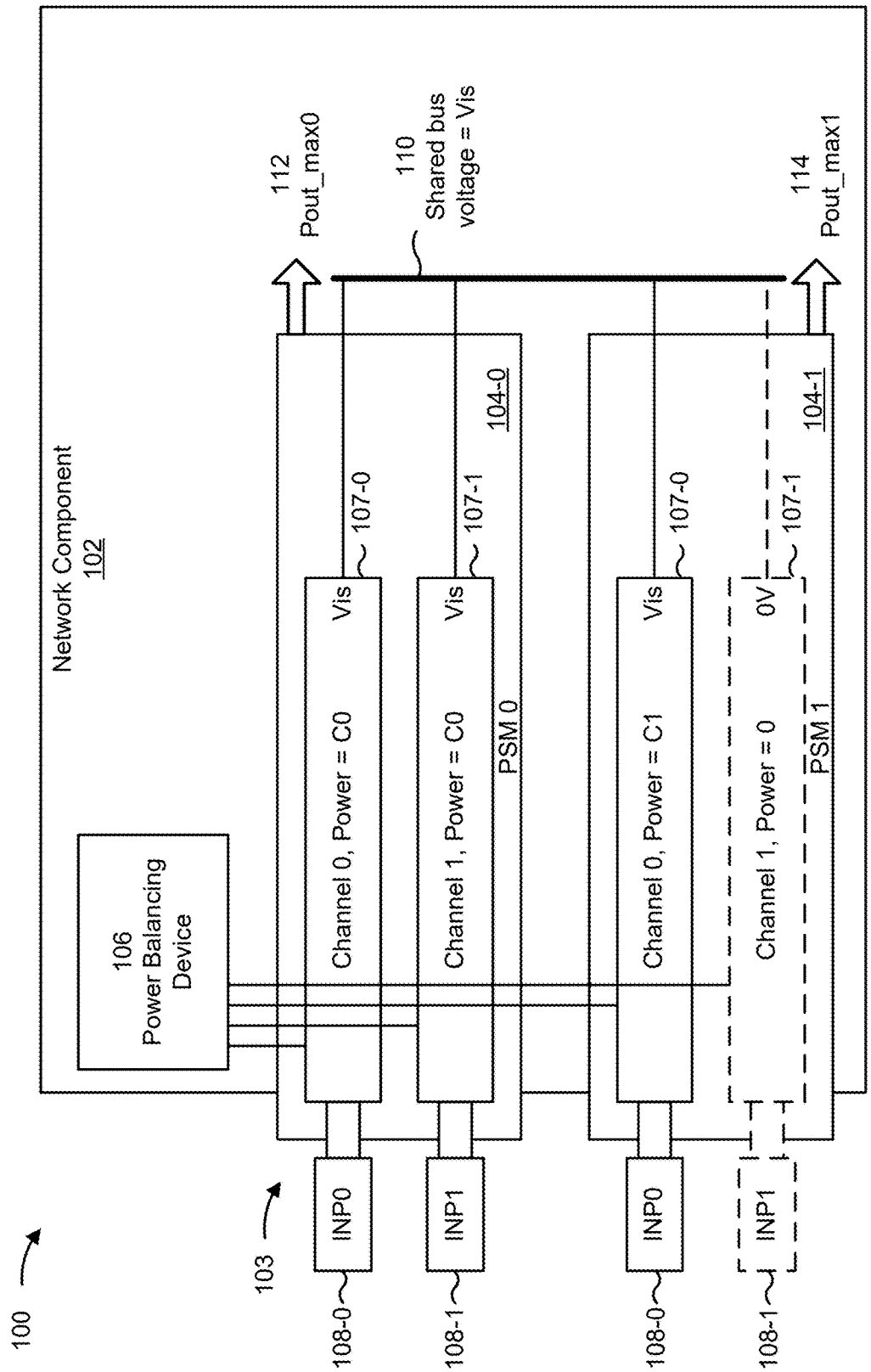

In some other implementations, one or more power supply channels 107 may be inoperable, and thus the power balancing device 106 may allocate a load among the remaining power supply channels 107 such that a respective current at each power supply channel 107 remains below a maximum permissible current (e.g., an OCP amperage, such as 16 A, among other examples). More particularly, as shown in FIG. 1B, not every power supply channel 107 is in an operable state, and thus the power balancing device 106 may be configured to allocate an electrical load unequally among the PSMs 104 and/or the power supply channels 107. That is, as indicated using dashed lines in FIG. 1B, a second power supply channel 107-1 of the second PSM 104-1 may be inoperable, such as due to a failure of circuitry associated the power supply channel 107-1, a failure of an input (e.g., power input 108-1) associated with the power supply channel 107-1, a tripped circuit breaker at the power supply channel 107-1, or the like. In that regard, a power being outputted by the power supply channel 107-1 may be zero. Absent a balancing of the load among the remaining power supply channels 107 and/or PSMs, the first power supply channel 107-0 of the second PSM 104-0 may hit an OCP limit, thereby shutting down and/or resulting in cascading shutdowns of the various PSMs 104 and thus the power supply system 103 as a whole.

In some implementations, the power balancing device 106 may thus monitor the various power supply channels 107, detect that the second power supply channel 107-1 of the second PSM 104-1 is inoperable, and dynamically adjust a load at each PSM 104 and/or remaining operable power supply channel 107 in order to eliminate an OCP shutdown on the remaining power supply channels 107 and/or PSMs 104 (e.g., in order to maintain a current at each remaining power input 108 under 16 A, or the like). For example, the power balancing device 106 may determine that at least one power supply channel 107 (e.g., the second power supply channel 107-1 of the second PSM 104-1) is inoperable. Moreover, based on determining that the at least one power supply channel 107 is inoperable, the power balancing device 106 may be configured to determine a revised maximum output power (sometimes referred to as Pout_max1) for the corresponding PSM 104 (e.g., the second PSM 104-1 in the example shown in FIG. 1B) and/or to cause the PSM 104 (e.g., PSM 104-1) to output a power that is less than or equal to the revised maximum output power (e.g., Pout_max1).

In some implementations, the revised maximum output power may be less than the maximum output power under normal operating conditions (e.g., Pout_max1<Pout_max0), such that a current on the remaining operable power supply channels 107 remains below an OCP limit (e.g., 16 A). For example, in the implementation shown in FIG. 1B, and as indicated by reference number 114, the power balancing device 106 may determine that the second PSM 104-1 should output no more than Pout_max1 in order to maintain a current on the operable power supply channel 107-0 below an OCP current, and thus the power balancing device 106 may cause the operable power supply channel 107-0 to output a power (shown as C1) that is less than or equal to Pout_max1 (e.g., C1≤Pout_max1). In implementations in which more than one operable power supply channels 107 remains for certain PSM 104 (e.g., implementations involving a four-feed PSM in which one or two power supply channels 107 are inoperable and thus three or two power supply channels 107 remain operable), the power balancing device 106 may cause the remaining operable power supply channels 107 to output a power (e.g., C1) such that a sum of the output power from each operable power supply channel 107 is less than or equal to Pout_max1 (e.g., for L remaining operable power supply channels 107, L×C1≤Pout_max1). In that regard, in the implementation shown in FIG. 1B, in response to Vis being present at the shared bus 110, the first power supply channel 107-0 and the second power supply channel 107-1 of the first PSM 104-0 may output a power of C0, because all power supply channels 107 of the first PSM 104-0 remain operable. However, the power balancing device 106 may cause the first power supply channel 107-0 of the second PSM 104-1 to output a power of C1, which is less than or equal to Pout_max1. Accordingly, a total power supplied to the network component 102 may be equal to 2×C0+C1 (with C0 and C1 varied in proportion to a magnitude of Vis present at the shared bus 110), and/or a maximum power available from the power supply system 103 may be equal to Pout_max0+Pout_max1.

Figure 1C:
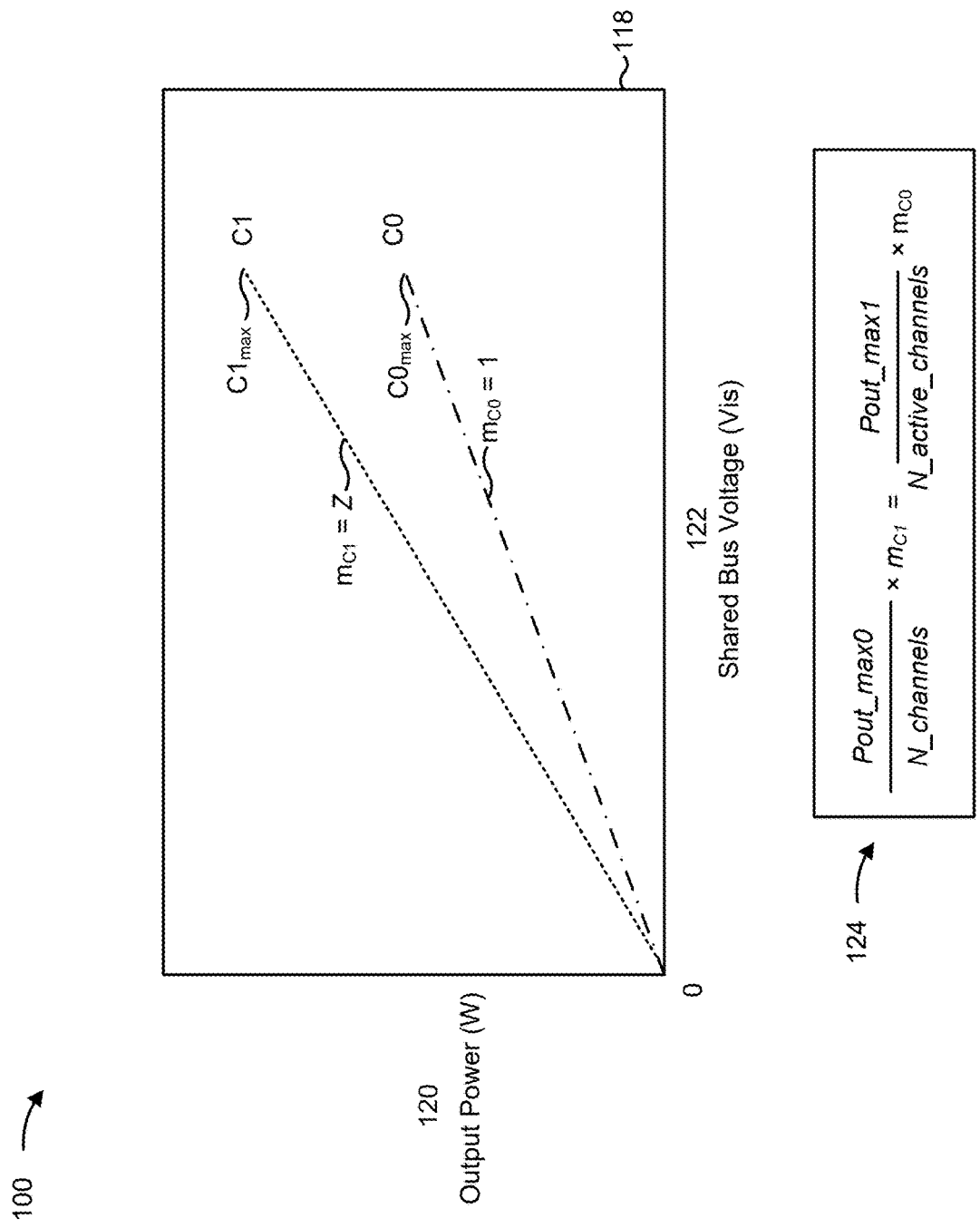

FIG. 1C illustrates a relationship between C0, C1, and Vis, according to some implementations. More particularly, the plot shown by reference number 118 includes a first axis corresponding to an output power of a power supply channel 107, as shown by reference number 120, and a second axis corresponding to a shared bus voltage (e.g., Vis), as shown by reference number 122. As shown, a PSM 104 may be configured to vary an output power of each power supply channel 107 from a minimum output power (e.g., 0 V) to a maximum output power (e.g., $C0_{max}$, $C1_{max}$) in proportion to a shared bus voltage (e.g., Vis) present at a shared bus voltage pin and/or connector at the PSM 104 and/or power supply channel 107. A slope of a curve corresponding to C1 (e.g., a voltage output by an operable power supply channel 107 of a PSM 104 when one or more other power supply channels 107 of the PSM 104 are inoperable), which is shown as $m_{C1}$, is steeper than a slope of a slope of a curve corresponding to C0 (e.g., a voltage output by an operable power supply channel 107 of a PSM 104 when all power supply channels 107 of the PSM 104 are operable), which is shown as $m_{C0}$. More particularly, in implementations in which the normalized slope of the curve corresponding to C0 is equal to 1 (e.g., $m_{C0}=1$), the normalized slope of the curve corresponding to C1 may be equal to Z, which may be greater than 1 (e.g., $m_{C1}=Z$, with Z>1).

In that regard, as an electrical load on the power supply system 103 increases, a load on an operable power supply channel 107 of a PSM 104 when one or more other power supply channels 107 of the PSM 104 are inoperable may increase at a faster rate than a load on an operable power supply channel 107 of a PSM 104 when all power supply channels 107 of the PSM 104 are operable. This may be indicative of the operable power supply channel 107 of the PSM 104 for which one or more other power supply channels 107 of the PSM 104 are inoperable bears at least a portion of the load that would have otherwise been allocated to the inoperable power supply channels 107. However, as described above in connection with FIG. 1B, a total power output (e.g., Pout_max1) for a PSM 104 for which one or more power supply channels 107 of the PSM 104 are inoperable may be less than a total power output (e.g., Pout_max0) for a PSM 104 for which all power supply channels 107 of the PSM 104 are operable, such as for a purpose of maintaining an input current to each operable power supply channel 107 below a maximum allowable input current (e.g., 16 A) and thus avoiding a shutdown caused by an OCP system of the PSM 104, among other examples. Put another way, an operable power supply channel 107 of a PSM 104 for which at least one power supply channel is inoperable is not expected to support an entire electrical load normally allocated to a fully functional PSM 104, thereby reducing a chance of an overcurrent situation and/or a shutdown of the PSM 104 due to an OCP system, or the like.

In some implementations, the power balancing device 106 may cause a PSM 104 for which one or more power supply channels 107 of the PSM 104 are inoperable to output a power that is less than or equal to the revised maximum output power (e.g., Pout_max1) and/or may cause operable power supply channel 107 of the PSM 104 for which one or more other power supply channels 107 of the PSM 104 are inoperable to output C1 by determining a power adjustment factor and/or adjusting a default maximum output power (e.g., Pout_max0) using the power adjustment factor. For example, in some implementations, the power adjustment factor may correspond to the normalized slope of the curve corresponding to C1 (e.g., $m_{c1}$ or Z). More particularly, as indicated by reference number 124, a revised maximum output power may be determined according to the following power-balancing expression:

$$\frac{\text{Pout\_max0}}{\text{N\_channels}} \times m_{C1} = \frac{\text{Pout\_max1}}{\text{N\_active\_channels}} \times m_{C0},$$

where N_channels corresponds to the total quantity of power supply channels 107 for a PSM 104 in a power supply system 103 (e.g., 2 for a dual-feed PSM, 4 for a four-feed PSM), and N_active_channels corresponds to the total quantity of active and/or operable channels for a given PSM 104 (e.g., a PSM 104 for which Pout_max1 is being computed). In that regard, for the implementation in which the slope of the curve corresponding to C0 (e.g., $m_{C0}$) is normalized as 1, and the normalized slope of the curve corresponding to C1 (e.g., $m_{C1}$) is expressed as Z (e.g., the power adjustment factor), the above-described expression may become $$\frac{\text{Pout\_max0}}{\text{N\_channels}} \times Z = \frac{\text{Pout\_max1}}{\text{N\_active\_channels}} \times 1.$$

In this regard, using a known power adjustment factor, Z, the power balancing device 106 may determine a revised maximum output power (e.g., Pout_max1) for a given PSM 104 using the expression $$\text{Pout\_max1} = \frac{\text{Pout\_max0} \times \text{N\_active\_channels}}{\text{N\_channels}} \times Z,$$

and/or may determine a revised maximum output power of each operable power supply channel 107 of the PSM 104 (e.g., $C1_{max}$) by dividing the revised maximum output power (e.g., Pout_max1) by the quantity of active and/or operable power supply channels 107 (e.g., N_active_channels). Thus, using a known power adjustment factor, Z, the power balancing device 106 may determine a revised maximum output power of each operable power supply channel 107 of the PSM 104 using the expression $$C1_{max} = \frac{\text{Pout\_max0} \times \text{N\_active\_channels}}{\text{N\_channels} \times \text{N\_active\_channels}} \times Z,$$

or, more simply, $$C1_{max} = \frac{\text{Pout\_max0}}{\text{N\_channels}} \times Z.$$

Similarly, using the known power adjustment factor, Z, the power balancing device 106 may determine a revised instantaneous output power of each operable power supply channel 107 of the PSM 104 using the expression C1=C0×Z.

In some implementations, a value of the adjustment factor, Z, may be based on a number of active power supply channels 107 at the PSM 104. For example, for a four-feed PSM, the power balancing device 106 may use a first power adjustment factor when the PSM includes one inoperable power supply channel 107 and thus three operable power supply channels 107, the power balancing device 106 may use a second power adjustment factor, that is different from the first power adjustment factor, when the PSM includes two inoperable power supply channels 107 and thus two operable power supply channels 107 (e.g., the second power adjustment factor may be larger than the first power adjustment factor, which is described in more detail below in connection with FIG. 1E), and/or the power balancing device 106 may use a third power adjustment factor, that is different from the first power adjustment factor and/or the second power adjustment factor, when the PSM includes three inoperable power supply channels 107 and thus one operable power supply channel 107.

Additionally, or alternatively, a value of the power adjustment factor for a given PSM 104 configuration may be selected in order to output a highest possible output power from the PSM 104, restricted by design and thermal performance with different input configurations. In that regard, in some implementations the power balancing device 106 may include (e.g., in one or more memories coupled thereto) multiple candidate power adjustment factors, with each of the multiple candidate power adjustments corresponding to a certain PSM 104 configuration (e.g., a certain quantity of active power supply channels 107, among other examples). In such implementations, the power balancing device 106 may be configured to select an applicable power adjustment factor, from the multiple candidate power adjustment factors, based on a quantity of power supply channels 107 that are operable at the PSM 104 and/or other input configurations. For example, for a four-feed PSM, the power balancing device 106 may select a first power adjustment factor (sometimes referred to as $Z_1$) when three power supply channels 107 are operable, the power balancing device 106 may select a second power adjustment factor (sometimes referred to as $Z_2$) when two power supply channels 107 are operable, and the power balancing device 106 may select a third power adjustment factor (sometimes referred to as $Z_3$) when three power supply channels 107 are operable, among other examples. In some other implementations, the power balancing device 106 may be configured to compute an applicable power adjustment factor based on the quantity of the multiple power supply channels 107 that are operable. For example, the power balancing device 106 may be configured and/or otherwise associated with an equation and/or an expression for computing applicable power adjustment factor using the quantity of the multiple power supply channels 107 that are operable as an input to the equation, the expression, or the like.

Figure 1D:
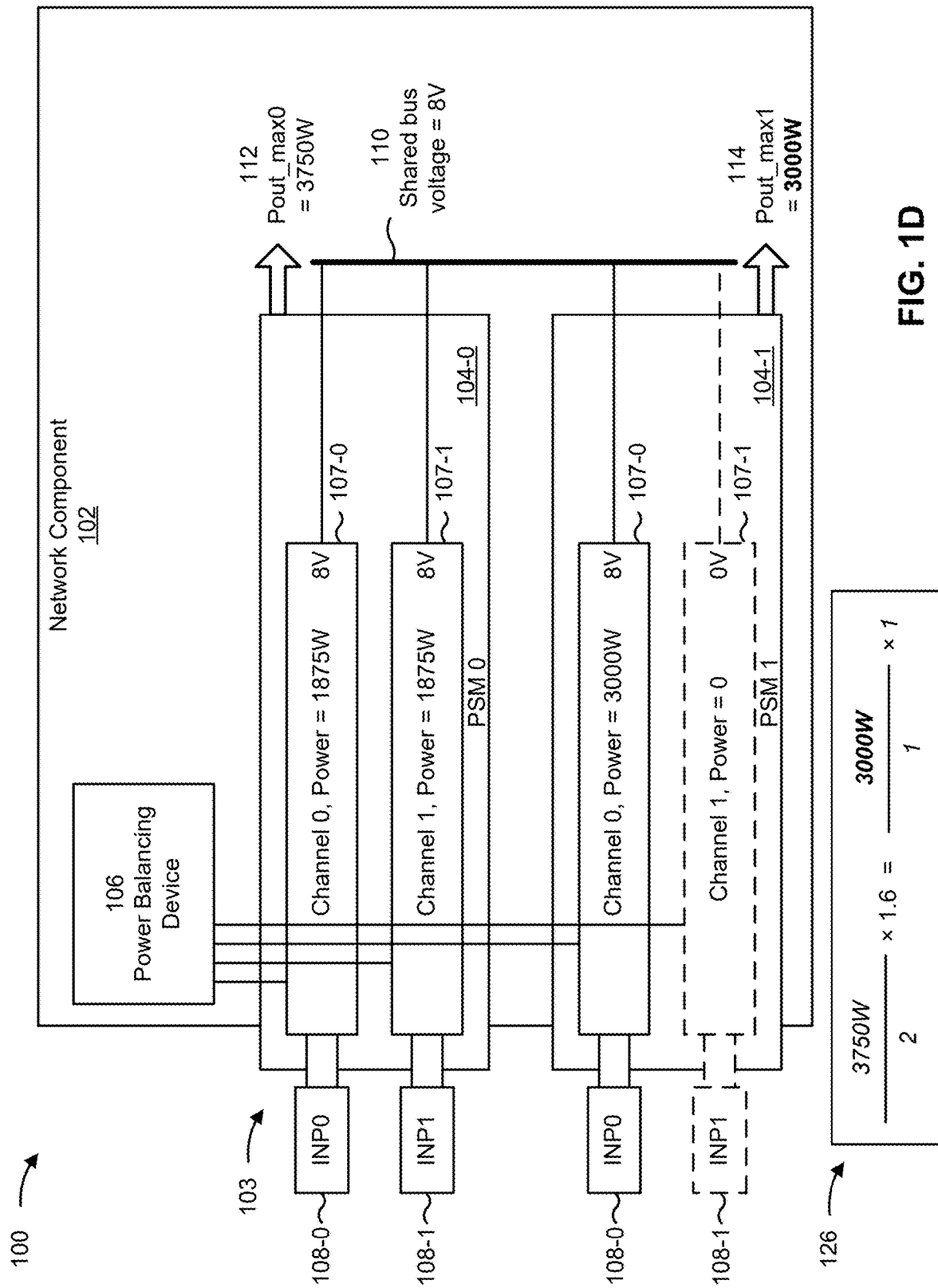

FIG. 1D shows a numerical example, according to some implementations. In this implementation, when all power supply channels 107 of the PSM 104-0 are operable, the PSM 104-0 may be configured to output a maximum output power of 3750 W (e.g., Pout_max0=3750 W), and thus each power supply channel 107, of the dual-feed PSM 104-0, may be configured to output a maximum output power of 1875 W (e.g., $C0_{max}$=1875 W). Moreover, the power supply system 103 may be configured to vary a shared bus voltage (e.g., Vis) between 0 and $Vis_{max}$ based on power demand, with $Vis_{max}$ being equal to 8 V in the example shown in FIG. 1D. Accordingly, when 8 V (e.g., $Vis_{max}$) is supplied to the shared bus voltage pin and/or connection of the power supply channels 107 of the first PSM 104-0, each power supply channel 107 of the first PSM 104-0 may output 1875 W (e.g., C0=1875 W for Vis=8 V).

However, as indicated using dashed lines in FIG. 1D, the second power supply channel 107-1 and/or the second power input 108-1 of the second PSM 104-1 are inoperable. Accordingly, the power balancing device 106 may determine a revised maximum output power for the second PSM 104-1 (e.g., Pout_max1) and/or a revised maximum output power for the first (e.g., operable) power supply channel 107-0 of the second PSM 104-1 (e.g., $C1_{max}$), and/or may cause the second PSM 104-1 to output a power that is less than or equal to the revised maximum output power (e.g., C1≤Pout_max1).

For example, as described above in connection with FIG. 1C, the power balancing device 106 may determine a revised maximum output power for the second PSM 104-1 based on the expression $$\frac{\text{Pout\_max0}}{\text{N\_channels}} \times Z = \frac{\text{Pout\_max1}}{\text{N\_active\_channels}} \times 1.$$

By way of example, if the power adjustment factor (e.g., Z) corresponding to one inoperable power supply channel 107 of the second PSM 104-1 is 1.6 (e.g., based on a design and/or thermal performance of the second PSM 104-1), then the revised maximum output power (e.g., Pout_max1) may be determined to be 3000 W, as indicated by reference number 126, and/or the revised maximum output power of the operable power supply channel 107 (e.g., $C1_{max}$) may be determined to be the revised maximum output power (e.g., Pout_max1) divided by the quantity of operable power supply channels 107 (e.g., one in this example), or 3000 W. Or, computed another way, the revised maximum output power of the operable power supply channel 107 (e.g., $C1_{max}$) may be determined to be the maximum output power of each power supply channel 107 under normal operating conditions (e.g., $C0_{max}$) multiplied by the power adjustment factor (e.g., $C1_{max}$=$C0_{max}$×Z, which in this example is 1875 W×1.6=3000 W).

Accordingly, when 8 V (e.g., $Vis_{max}$) is supplied to the shared bus voltage pin and/or connector of the first (e.g., operable) power supply channel 107-0 of the second PSM 104-1, the first power supply channel 107-0 of the second PSM 104-1 may output 3000 W (e.g., C1=3000 W for Vis=8 V). In this regard, the amount of power supplied by the first power supply channel 107-0 of the second PSM 104-1 is lower than if the power balancing device 106 did not cause the second PSM 104-1 to output a power that is less than or equal to the revised maximum output power (Pout_max1). This is because, without adjustment of the maximum output power as described above, the first power supply channel 107-0 of the second PSM 104-1 (as the only remaining operable power supply channel 107 of the second PSM 104-1) would otherwise be subject to a load of 3750 W (e.g., Pout_max0) at the maximum shared bus voltage (e.g., 8 V), which may cause a shutdown due to an OCP system or otherwise, and/or which could result in cascading shutdowns of the PSMs 104 and ultimately the power supply system 103 as a whole.

Although the example described above in connection with FIG. 1D is directed to a power supply system 103 including dual-feed PSMs 104, in some other implementations, a power supply system 103 may be associated with other multi-feed PSMs, such as four-feed PSMs, among other examples. For example, FIG. 1E shows example power adjustment factors and corresponding output powers for a two-feed, 3 kilowatt (kW) PSM, and a four-feed, 8 kW PSM.

In some implementations, the two-feed, 3 kW PSM may be substantially similar to the PSMs 104 described above in connection with FIGS. 1A-1D. In that regard, when both power supply channels are operable, each power supply channel may be configured to supply between 0 and 1875 W (e.g., $C0_{max}$), such that the PSM is capable of sustaining a load of up to 3750 W (e.g., Pout_max0). More particularly, as shown by reference number 128, in response to a shared bus voltage (e.g., Vis) of 0 V, each power supply channel may sustain a load of 0 W; in response to a shared bus voltage of 4 V, each power supply channel may sustain a load of 937.5 W for a total power output of 1875 W; and in response to a shared bus voltage of 8 V, each power supply channel may sustain a load of 1875 W for a total power output of 3750 W. However, when one feed of the dual-feed, 3 kW PSM is inoperable, the maximum output power of the PSM and/or the maximum output power of the remaining feed of the PSM may be adjusted based on the power adjustment factor (e.g., Z), which, in the example shown in FIG. 1E, is 1.6. In that regard, when only one power supply channel is operable, the operable power supply channel may be configured to supply between 0 and 3000 W (e.g., $C1_{max}$), such that the PSM is capable of sustaining a load of up to 3000 W (e.g., Pout_max1). More particularly, as shown by reference number 130, in response to a shared bus voltage (e.g., Vis) of 0 V, the operable power supply channel may sustain a load of 0 W; in response to a shared bus voltage of 4 V, the operable power supply channel may sustain a load of 1500 W (which is equal to the load sustained by each power supply channel when all power supply channels are operable (e.g., 937.5 W) multiplied by the power adjustment factor (e.g., 1.6)); and, in response to a shared bus voltage of 8 V, the operable power supply channel may sustain a load of 3000 W (e.g., 1875 W×1.6) for a total output power of 3000 W (e.g., Pout_max1).

With respect to the four-feed, 8 kW PSM, when all four power supply channels are operable, each power supply channel may be configured to supply between 0 and 2000 W, such that the PSM is capable of sustaining a load of up to 8000 W. More particularly, as shown by reference number 132, in response to a shared bus voltage (e.g., Vis) of 0 V, each power supply channel may sustain a load of 0 W; in response to a shared bus voltage of 4 V, each power supply channel may sustain a load of 1000 W for a total output of 4000 W; and, in response to a shared bus voltage of 8 V, each power supply channel may sustain a load of 2000 W for a total output of 8000 W. However, when one feed of the four-feed, 8 kW PSM is inoperable (e.g., when only three feeds of the four-feed PSM are operable), the maximum output power of the PSM and/or the maximum output power remaining feeds of the PSM may be adjusted based on the power adjustment factor (e.g., Z), which, in the example shown in FIG. 1E, may be 1.33. In that regard, when only three power supply channels are operable, the operable power supply channels may be configured to supply between 0 and 2666.67 W, such that the PSM is capable of sustaining a load of up to 8000 W (e.g., in this implementation, the PSM may still achieve maximum output power 8000 W, albeit using only three power supply channels rather than four). More particularly, as shown by reference number 134, in response to a shared bus voltage (e.g., Vis) of 0 V, each operable power supply channel may sustain a load of 0 W; in response to a shared bus voltage of 4 V, each operable power supply channel may sustain a load of 1333.33 W (which is equal to the load sustained by each power supply channel when all power supply channels are operable (e.g., 1000 W), multiplied by the power adjustment factor (e.g., 1.33)), for a total output of 4000 W; and, in response to a shared bus voltage of 8 V, each operable power supply channel may sustain a load of 2666.67 W (e.g., 2000 W×1.33), for a total output of 8000 W.

Similarly, when two feeds of the four-feed, 8 kW PSM are inoperable (e.g., when only two feeds of the four-feed PSM are operable), the maximum output power of the PSM and/or the maximum output power of the remaining feeds of the PSM may be adjusted based on the power adjustment factor (e.g., Z), which, in the example shown in FIG. 1E, may be 1.5. Accordingly, power adjustment factor may change depending on how many inputs are active, as described above (e.g., 1.33 for three active inputs and 1.5 for two active inputs, among other examples). In this regard, when only two power supply channels are operable, the operable power supply channels may be configured to supply between 0 and 3000 W, such that the PSM is capable of sustaining a load of up to 6000 W. More particularly, as shown by reference number 136, in response to a shared bus voltage (e.g., Vis) of 0 V, each operable power supply channel may sustain a load of 0 W; in response to a shared bus voltage of 4 V, each operable power supply channel may sustain a load of 1500 W (e.g., 1000 W×1.5), for a total output of 3000 W; and, in response to a shared bus voltage of 8 V, each power supply channel may sustain a load of 3000 W (e.g., 2000 W×1.5), for a total output of 6000 W. And when three feeds of the four-feed, 8 kW PSM are inoperable (e.g., when only one feed of the four-feed PSM are operable), the maximum output power of the PSM and/or the remaining feeds of the PSM may be adjusted based on the power adjustment factor (e.g., Z), which, in the example shown in FIG. 1E, may be 1.5. In this regard, when only one power supply channel is operable, the operable power supply channel may be configured to supply between 0 and 3000 W, such that the PSM is capable of sustaining a load of up to 3000 W. More particularly, as shown by reference number 138, in response to a shared bus voltage (e.g., Vis) of 0 V, the operable power supply channel may sustain a load of 0 W; in response to a shared bus voltage of 4 V, the operable power supply channel may sustain a load of 1500 W (e.g., 1000 W×1.5), for a total output of 1500 W; and in response to a shared bus voltage of 8 V, each power supply channel may sustain a load of 3000 W (e.g., 2000 W×1.5), for a total output of 3000 W.

Figure 1F:
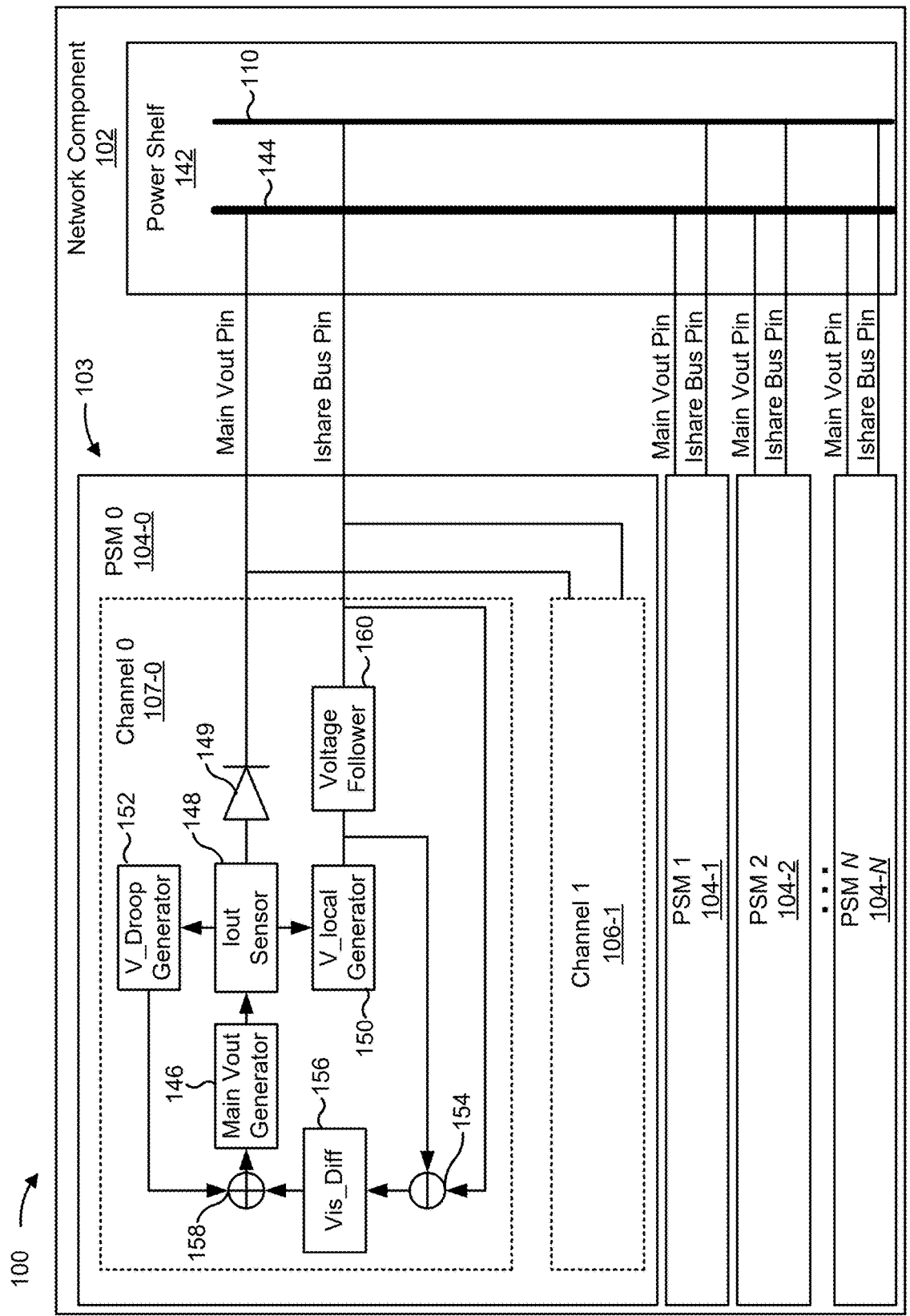

FIG. 1F shows electrical components that may be used to vary an output power of a PSM 104 and/or a power supply channel 107, such as in response to identifying that one or more power supply channels 107 of a PSM 104 are inoperable. In the example shown in FIG. 1F, only components of a first power supply channel 106-0 of a first PSM 104-0 are shown for ease of discussion. However, in some implementations, the other power supply channels 107 of the power supply system 103 may be associated with substantially similar electrical components.

As shown in FIG. 1F, each power supply channel 107 may be connected to the shared bus 110, such a via a pin and/or connector (shown in FIG. 1F as an "Ishare bus pin"), as described above in connection with FIGS. 1A-1C. In some implementations, the shared bus 110 may be part of a power shelf 142 associated with the network component 102, a midplane associated with the network component 102, or a similar device. Moreover, each PSM 104, and thus each power supply channel 107 of each PSM 104, may be connected in parallel to a main voltage bus 144, which may also be part of the power shelf 142, the midplane, or the similar device. More particularly, each PSM 104, and thus each power supply channel 107 of each PSM 104, may be connected in parallel to the main voltage bus 144 via pin and/or connector (shown in FIG. 1F as "Main Vout pin"). In some implementations, the main voltage bus 144 may be associated with a voltage source for electronic components of the network component 102.

In some implementations, an output power of each power supply channel 107 may be adjusted by adjusting an output voltage (sometimes referred to as Vout) at the respective power supply channel 107. Put another way, in implementations in which an output power of a power supply channel 107 is to be adjusted in response to detecting that one or more power supply channels are inoperable, the power supply channel 107 and/or a corresponding PSM 104 may be configured to vary an output voltage associated with the power supply channel 107, accordingly. More particularly, the power supply channel 107 may include a main output voltage generator 146 configured to produce the output voltage (e.g., Vout) for the power supply channel 107, such as in response to a shared voltage (e.g., Vis) being present at the shared bus 110 and thus the Ishare bus pin of the power supply channel 107. In some implementations, the shared voltage (e.g., Vis) may thus be fed from the Ishare bus pin to an input of the main output voltage generator 146, as shown in FIG. 1F, such as for a purpose of varying an output voltage generated by the main output voltage generator 146 in proportion to the Vis voltage level.

The power supply channel 107 may include one or more additional components configured to augment a voltage that is supplied as an input to the main output voltage generator 146. For example, in some implementations, the power supply channel may include an output current (Iout) sensor 148, which may be configured to sense a current associated with the output voltage (e.g., Vout) (e.g., the output current sensor 148 may sense a current associated with the main output voltage that is being supplied by the power supply channel 107 to the main voltage bus 144, such as via an Oring 149 (e.g., a diode) or similar electrical component). In some implementations, the output current sensor 148 may provide measurements (e.g., a sensed current) to one or more additional voltage generators, such as a local voltage generator 150 and/or a droop voltage generator 152. The local voltage generator 150 may be configured to generate a voltage between 0 V and a maximum local voltage (Vlocal$_{max}$) in response to a sensed current of between 0 A and a full load current (sometimes referred to as I_full_load). In some implementations, Vlocal$_{max}$ may be equal to Vis$_{max}$, such as 8 V. The droop voltage generator 152 may be configured to generate a voltage between 0 V and a maximum droop voltage (Vdroop$_{max}$) in response to a sensed current of between 0 A and I_full_load. In some implementations, Vdroop$_{max}$ may be equal to 2 V.

Accordingly, when the PSM 104 is operating at a certain load, in response to receiving a current measurement from the output current sensor 148 corresponding to the load, the local voltage generator may generate Vlocal (which may be between 0 V and 8 V), and/or the droop voltage generator 152 may generate Vdroop (which may be between 0 V and 2 V). The local voltage (e.g., Vlocal) and the Vis may be fed to a differential component 154, which may determine a difference between the two voltages (Vis_diff), as indicated by defence number 156. Vis_diff and Vdroop may be fed to a summation component 158, which may determine a sum of Vis_diff and Vdroop. The sum of Vis_diff and Vdroop may be fed as an input to the main output voltage generator 146 for generating Vout (e.g., to be supplied to the power shelf 142 via the Oring 149). In this way, the main output voltage (e.g., Vout) of a power supply channel 107 may be dynamically adjusted, such as in response to identifying one or more inoperable power supply channels 107, as described above. Moreover, a locally generated voltage (e.g., Vlocal) may be fed to the shared bus 110 (e.g., via a voltage follower 160). In this way, the power supply system 103 may monitor a collective local voltage being generated by the various power supply channels 107 and/or adjust a load requirement for each of the multiple PSMs 104, accordingly.

Based on dynamically balancing a current among various power supply channels 107 in a PSM 104 of a power supply system 103 as described above, the power balancing device 106 and/or the power supply system 103 may cause the PSM 104 to remain below an OCP limit, thereby reducing a chance that the PSM 104 will shut down due and thus reducing a chance of a cascading shutdown of the PSMs 104 and ultimately a shutdown of the power supply system 103 as a whole. Additionally, or alternatively, by reducing shutdowns of PSMs 104 and/or the power supply system 103 as a whole, the power balancing device 106 and/or the power supply system 103 may result in increased network capacity, decreased network latency, and overall more efficient usage of network resources because the network component 102 associated with the power supply system 103 may be capable of more readily staying online, among other examples.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
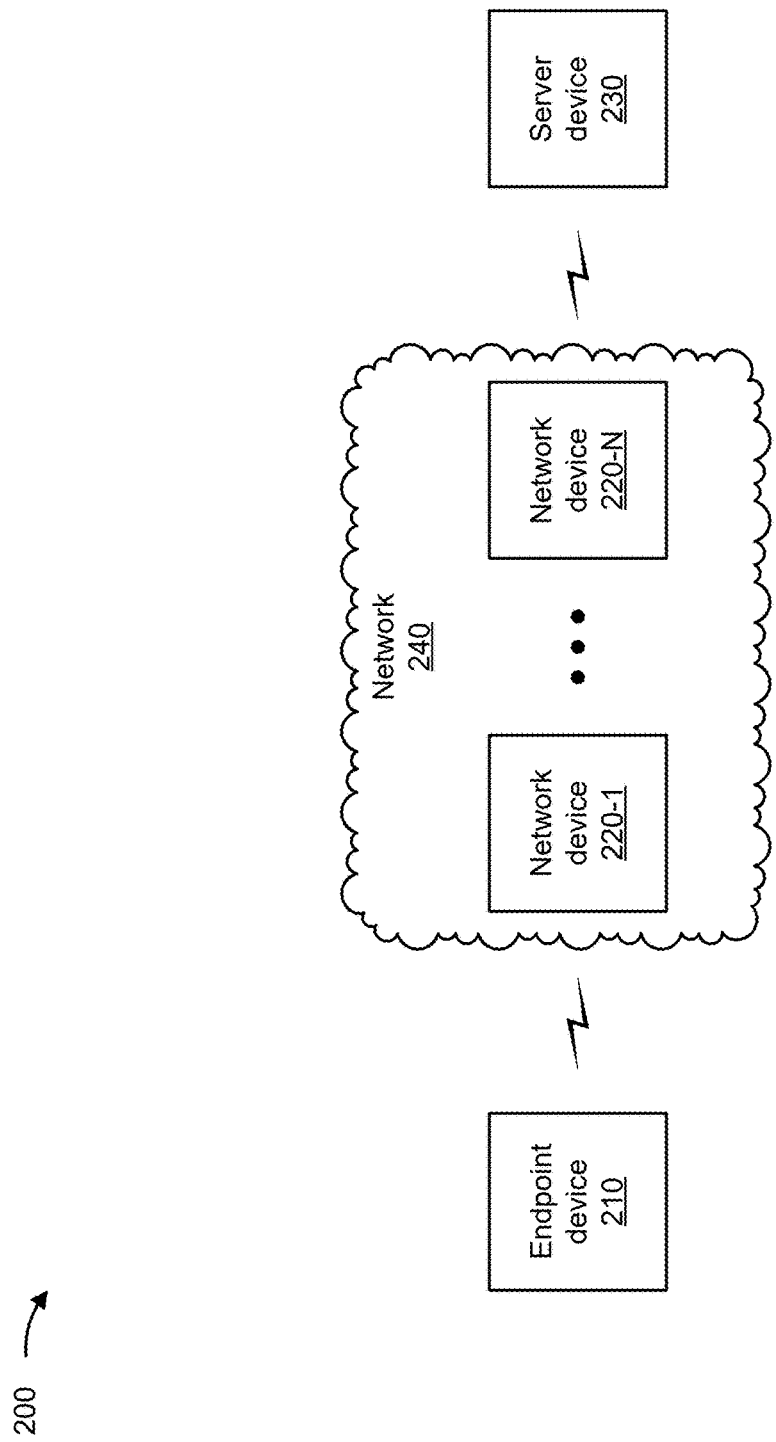
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210 and/or server device 230, via network 240 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as an LSR, an LER, an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Server device 230 includes one or more devices capable of receiving, generating, storing, processing, and/or providing information, such as information described herein. For example, server device 230 may include a laptop computer, a tablet computer, a desktop computer, a group of server devices, or a similar type of device, associated with multicast traffic. In some implementations, server device 230 may receive information from and/or transmit information (e.g., multicast traffic) to endpoint device 210, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN)), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
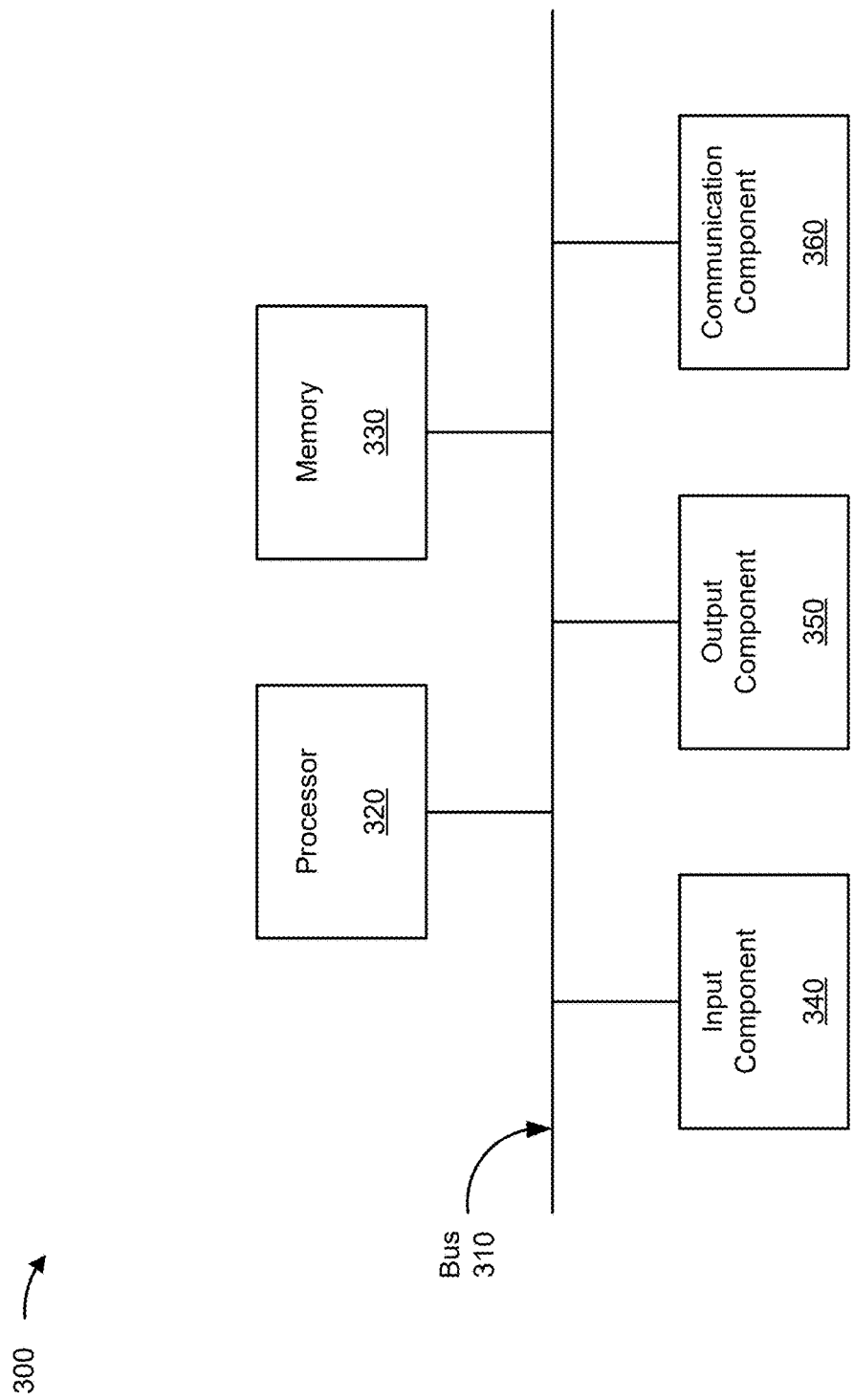
FIG. 3 is a diagram of example components of a device associated with power balancing for a power supply system.

FIG. 3 is a diagram of example components of a device 300 associated with power balancing for a power supply system. The device 300 may correspond to the network component 102, the power supply system 103, the PSM 104, the endpoint device 210, the network device 220, and/or the server device 230. In some implementations, the network component 102, the power supply system 103, the PSM 104, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
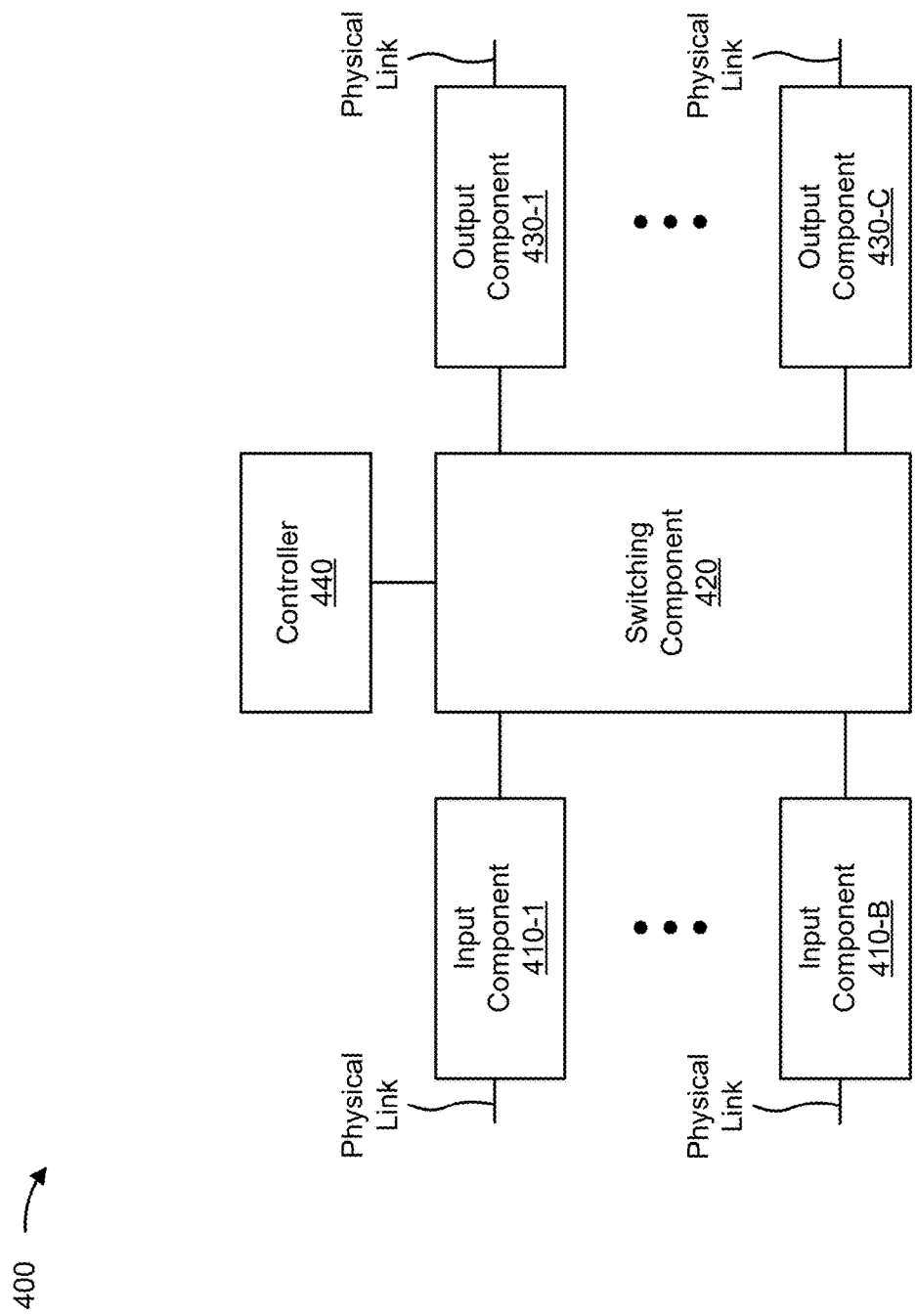
FIG. 4 is another diagram of example components of a device associated with power balancing for a power supply system.

FIG. 4 is a diagram of example components of a device 400 associated with power balancing for a power supply system. Device 400 may correspond to the network component 102, the power supply system 103, the PSM 104, the endpoint device 210, the network device 220, and/or the server device 230. In some implementations, the network component 102, the power supply system 103, the PSM 104, the endpoint device 210, the network device 220, and/or the server device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
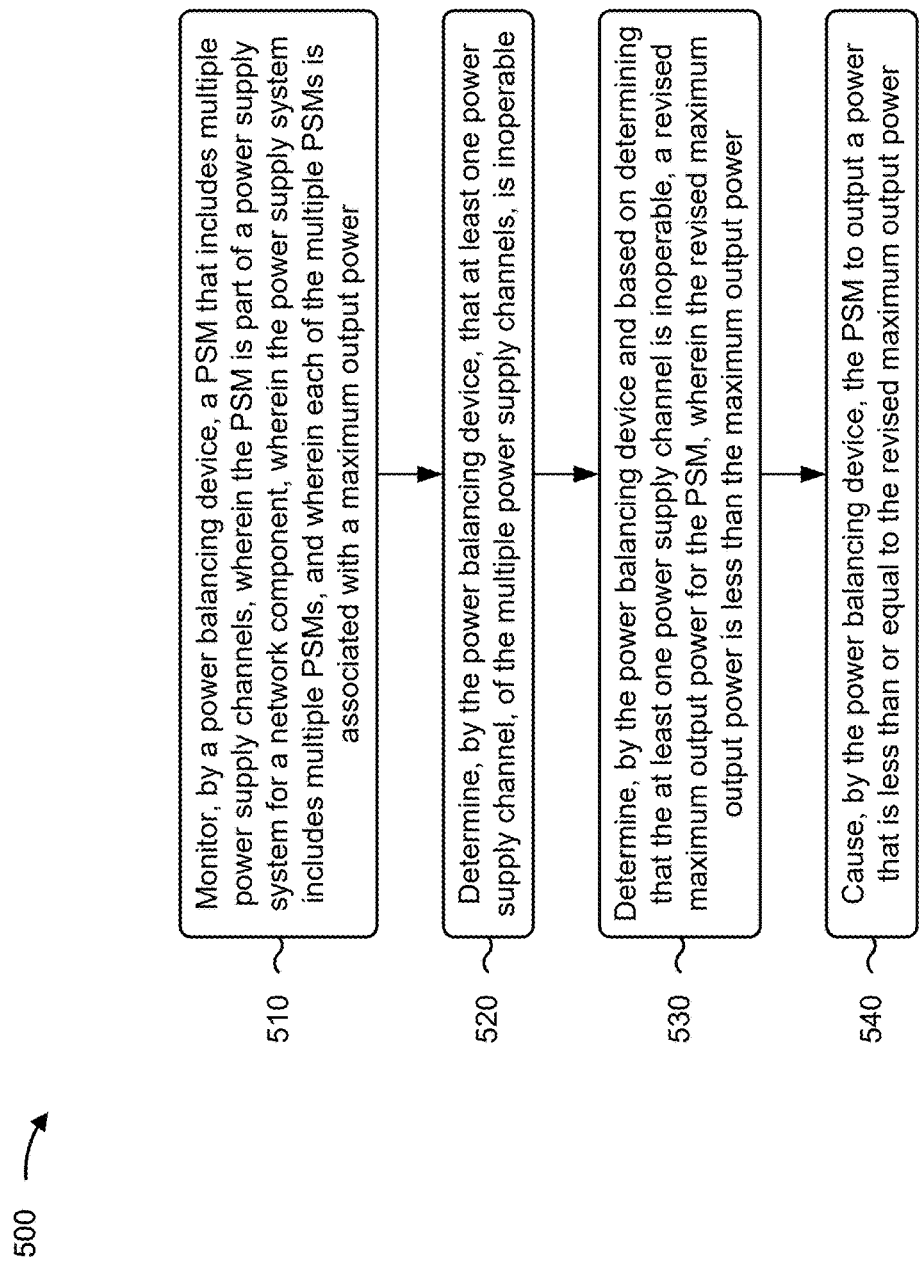
FIG. 5 is a flowchart of an example process associated with power balancing for a power supply system.

FIG. 5 is a flowchart of an example process 500 associated with power balancing for a power supply system. In some implementations, one or more process blocks of FIG. 5 are performed by a power balancing device (e.g., power balancing device 106). In some implementations, one or more process blocks of FIG. 5 are performed by another device or a group of devices separate from or including the power balancing device, such as a network component (e.g., network component 102), a power supply system (e.g., power supply system 103), a PSM (e.g., PSM 104), an endpoint device (e.g., endpoint device 210), a network device (e.g., network device 220) and/or a server device (e.g., server device 230). Additionally, or alternatively, one or more process blocks of FIG. 5 may be performed by one or more components of device 300, such as processor 320, memory 330, input component 340, output component 350, and/or communication component 360. Additionally, or alternatively, one or more process blocks of FIG. 5 may be performed by one or more components of device 400, such as input component 410, switching component 420, output component 430, and/or controller 440.

As shown in FIG. 5, process 500 may include monitoring a PSM that includes multiple power supply channels, wherein the PSM is part of a power supply system for a network component, wherein the power supply system includes multiple PSMs, and wherein each of the multiple PSMs is associated with a maximum output power (block 510). For example, the power balancing device may monitor a PSM that includes multiple power supply channels, wherein the PSM is part of a power supply system for a network component, wherein the power supply system includes multiple PSMs, and wherein each of the multiple PSMs is associated with a maximum output power, as described above.

As further shown in FIG. 5, process 500 may include determining that at least one power supply channel, of the multiple power supply channels, is inoperable (block 520). For example, the power balancing device may determine that at least one power supply channel, of the multiple power supply channels, is inoperable, as described above.

As further shown in FIG. 5, process 500 may include determining, based on determining that the at least one power supply channel is inoperable, a revised maximum output power for the PSM based on a maximum allowable input current to each power supply channel, of the multiple power supply channels (block 530). For example, the power balancing device may determine, based on determining that the at least one power supply channel is inoperable, a revised maximum output power for the PSM based on a maximum allowable input current to each power supply channel, of the multiple power supply channels, as described above.

As further shown in FIG. 5, process 500 may include causing the PSM to output a power that is less than or equal to the revised maximum output power (block 540). For example, the power balancing device may cause the PSM to output a power that is less than or equal to the revised maximum output power, as described above.

Process 500 may include additional implementations, such as any single implementation or any combination of implementations described below and/or in connection with one or more other processes described elsewhere herein.

In a first implementation, the PSM includes multiple power inputs, wherein each power supply channel, of the multiple power supply channels, is associated with a corresponding power input, of the multiple power inputs, and wherein determining that the at least one power supply channel is inoperable includes determining that a power input associated with the at least one power supply channel is inoperable.

In a second implementation, alone or in combination with the first implementation, causing the PSM to output the power is based on determining the power using a power adjustment factor.

In a third implementation, alone or in combination with one or more of the first and second implementations, the power adjustment factor is associated with a ratio of an output power associated with the PSM to a shared bus voltage associated with the power supply system.

In a fourth implementation, alone or in combination with one or more of the first through third implementations, the power adjustment factor is associated with a quantity of the multiple power supply channels that are operable.

In a fifth implementation, alone or in combination with one or more of the first through fourth implementations, process 500 includes computing, by the power balancing device, the power adjustment factor based on the quantity of the multiple power supply channels that are operable.

In a sixth implementation, alone or in combination with one or more of the first through fifth implementations, process 500 includes selecting the power adjustment factor from multiple candidate power adjustment factors based on a quantity of the multiple power supply channels that are operable.

In a seventh implementation, alone or in combination with one or more of the first through sixth implementations, the revised maximum output power is less than the maximum out power.

In an eighth implementation, alone or in combination with one or more of the first through seventh implementations, causing the PSM to output the power is based on determining the power using a shared bus voltage associated with the power supply system.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   monitoring, by a power balancing device, a power supply module (PSM) that includes multiple power supply channels, wherein the PSM is part of a power supply system for a network component, wherein the power supply system includes multiple PSMs, and wherein each of the multiple PSMs is associated with a maximum output power;
   determining, by the power balancing device, that at least one power supply channel, of the multiple power supply channels, is inoperable;
   determining, by the power balancing device and based on determining that the at least one power supply channel is inoperable, a revised maximum output power for the PSM based on a maximum allowable input current to each power supply channel, of the multiple power supply channels; and
   causing, by the power balancing device, the PSM to output a power that is less than or equal to the revised maximum output power.

2. The method of claim 1, wherein the PSM includes multiple power inputs,
   wherein each power supply channel, of the multiple power supply channels, is associated with a corresponding power input, of the multiple power inputs, and
   wherein determining that the at least one power supply channel is inoperable includes determining that a power input associated with the at least one power supply channel is inoperable.

3. The method of claim 1, wherein causing the PSM to output the power is based on determining the power using a power adjustment factor.

4. The method of claim 3, wherein the power adjustment factor is associated with a ratio of an output power associated with the PSM to a shared bus voltage associated with the power supply system.

5. The method of claim 3, wherein the power adjustment factor is associated with a quantity of the multiple power supply channels that are operable.

6. The method of claim 5, further comprising computing, by the power balancing device, the power adjustment factor based on the quantity of the multiple power supply channels that are operable.

7. The method of claim 3, further comprising selecting the power adjustment factor from multiple candidate power adjustment factors based on a quantity of the multiple power supply channels that are operable.

8. The method of claim 1, wherein the revised maximum output power is less than the maximum output power.

9. The method of claim 1, wherein causing the PSM to output the power is based on determining the power using a shared bus voltage associated with the power supply system.

10. A power balancing device, comprising:
    one or more memories; and
    one or more processors to:
       monitor a power supply module (PSM) that includes multiple power supply channels, wherein the PSM is part of a power supply system for a network component, wherein the power supply system includes multiple PSMs, and wherein each of the multiple PSMs is associated with a maximum output power;
       determine that at least one power supply channel, of the multiple power supply channels, is inoperable;
       determine, based on determining that the at least one power supply channel is inoperable, a revised maximum output power for the PSM based on a maximum allowable input current to each power supply channel, of the multiple power supply channels; and
       cause the PSM to output a power that is less than or equal to the revised maximum output power.

11. The power balancing device of claim 10, wherein the PSM includes multiple power inputs,
    wherein each power supply channel, of the multiple power supply channels, is associated with a corresponding power input, of the multiple power inputs, and
    wherein the one or more processors, to determine that the at least one power supply channel is inoperable, are to determine that a power input associated with the at least one power supply channel is inoperable.

12. The power balancing device of claim 10, wherein the one or more processors, to cause the PSM to output the power, are to cause the PSM to output the power based on determining the power using a power adjustment factor.

13. The power balancing device of claim 12, wherein the power adjustment factor is associated with a ratio of an output power associated with the PSM to a shared bus voltage associated with the power supply system.

14. The power balancing device of claim 12, wherein the power adjustment factor is associated with a quantity of the multiple power supply channels that are operable.

15. The power balancing device of claim 10, wherein the revised maximum output power is less than the maximum output power.

16. The power balancing device of claim 10, wherein the one or more processors, to cause the PSM to output the power, are to cause the PSM to output the power based on determining the power using a shared bus voltage associated with the power supply system.

17. A non-transitory computer-readable medium storing a set of instructions, the set of instructions comprising:
   one or more instructions that, when executed by one or more processors of a power balancing device, cause the power balancing device to:
      monitor a power supply system for a network component, wherein the power supply system includes multiple power supply modules (PSMs) that each include multiple power supply channels, and wherein each of the multiple PSMs is associated with a default maximum output power;
      determine that at least one power supply channel, of the multiple power supply channels of a PSM, of the multiple PSMs, is inoperable;
      determine, based on determining that the at least one power supply channel is inoperable, a revised maximum output power for the PSM based on a maximum allowable input current to each power supply channel, of the multiple power supply channels; and
      cause the PSM to output a power that is less than or equal to the revised maximum output power.

18. The non-transitory computer-readable medium of claim 17, wherein each PSM, of the multiple PSMs, is associated with multiple power inputs,
   wherein each power supply channel, of the multiple power supply channels of the PSM, is associated with a corresponding power input, of the multiple power inputs associated with the PSM, and
   wherein the one or more instructions, that cause the power balancing device to determine that the at least one power supply channel is inoperable, cause the power balancing device to determine that a power input associated with the at least one power supply channel is inoperable.

19. The non-transitory computer-readable medium of claim 17, wherein the one or more instructions, that cause the power balancing device to cause the PSM to output the power, cause the power balancing device to determine the power using a power adjustment factor.

20. The non-transitory computer-readable medium of claim 19, wherein the power adjustment factor is associated with a ratio of an output power associated with the PSM to a shared bus voltage associated with the power supply system.

* * * * *